United States Patent
Lerzer et al.

(10) Patent No.: US 11,374,785 B2
(45) Date of Patent: Jun. 28, 2022

(54) MODULAR PROCESSOR ARCHITECTURE OF A COCKPIT AND INFOTAINMENT SYSTEM FOR A VEHICLE

(71) Applicant: AUDI AG, Ingolstadt (DE)

(72) Inventors: Jürgen Lerzer, Neumarkt (DE); Matthijs Paffen, Karlskron (DE); Hans Georg Gruber, Ingolstadt (DE); Michael Schmailzl, Kösching (DE); Christoph Dalke, Kipfenberg (DE)

(73) Assignee: Audi AG, Ingolstadt (DE)

( * ) Notice: Subject to any disclaimer, the term of this patent is extended or adjusted under 35 U.S.C. 154(b) by 200 days.

(21) Appl. No.: 16/763,890

(22) PCT Filed: Nov. 9, 2018

(86) PCT No.: PCT/EP2018/080709
§ 371 (c)(1),
(2) Date: May 13, 2020

(87) PCT Pub. No.: WO2019/096676
PCT Pub. Date: May 23, 2019

(65) Prior Publication Data
US 2021/0111920 A1    Apr. 15, 2021

(30) Foreign Application Priority Data
Nov. 16, 2017    (DE) .................... 10 2017 220 464.8

(51) Int. Cl.
*H04L 12/40*    (2006.01)
*B64D 11/00*    (2006.01)

(52) U.S. Cl.
CPC .......... *H04L 12/40* (2013.01); *B64D 11/0015* (2013.01); *H04L 2012/4028* (2013.01)

(58) Field of Classification Search
CPC ......... A47J 37/0658; F24B 1/202; F24B 1/22; Y02A 40/928; B64D 11/0015;
(Continued)

(56) References Cited

U.S. PATENT DOCUMENTS

| 2013/0282946 A1* | 10/2013 | Ricci | G06F 13/4221 |
| | | | 710/306 |
| 2014/0309806 A1* | 10/2014 | Ricci | G06Q 10/20 |
| | | | 701/1 |
| 2015/0100633 A1* | 4/2015 | Barrett | H04L 67/04 |
| | | | 709/204 |

FOREIGN PATENT DOCUMENTS

| DE | 202015005533 U1 | 12/2015 |
| DE | 102015005704 A1 | 11/2016 |
| EP | 1908639 A1 | 4/2008 |

OTHER PUBLICATIONS

International Search Report and Written Opinion of the International Searching Authority directed to related International Patent Application No. PCT/EP2018/080709, dated Feb. 21, 2019, with attached English-language translation; 20 pages.

(Continued)

*Primary Examiner* — Omeed Alizada
(74) *Attorney, Agent, or Firm* — Sterne, Kessler, Goldstein & Fox P.L.L.C.

(57) ABSTRACT

The approach relates to a modular computer architecture of a cockpit and infotainment system for a vehicle that includes an I/O module with an I/O computing node (2.0) with at least one data memory, the I/O computing node being designed for processing audio data and as a host computer for performing host functions with ASIL safety requirements. The I/O module also includes a tuner with associated antenna interface, and at least one interface of a vehicle bus system. The modular computer architecture further includes at least one computing module with a computing node with (Continued)

at least one data memory for performing cockpit and infotainment functions, and at least one display interface.

22 Claims, 4 Drawing Sheets

(58) Field of Classification Search
CPC . C12N 15/01; C12N 1/36; C12N 1/38; C12Q 1/025; G06F 15/7803; H04L 12/40; H04L 2012/4028
See application file for complete search history.

(56) References Cited

OTHER PUBLICATIONS

Peti, P., et al., "An integrated architecture for future car generations," Eighth IEEE International Symposium on Object-Oriented Real-Time Distributed Computing, Piscataway, NJ, May 18-20, 2005; 12 pages.
"Backplane," Wikipedia.de, accessed May 22, 2016, accessible at https://de.wikipedia.org/w/index.php?title=Backplane&oldid=154605159, with attached English-language translation; 5 pages.
International Preliminary Report on Patentability directed to related International Patent Application No. PCT/EP2018/080709, completed Feb. 20, 2020, with attached English-language translation; 16 pages.

* cited by examiner

MODULAR PROCESSOR ARCHITECTURE OF A COCKPIT AND INFOTAINMENT SYSTEM FOR A VEHICLE

TECHNICAL FIELD

The disclosure relates to a modular computer architecture of a cockpit and infotainment system for a vehicle.

BACKGROUND

Modern vehicles of the applicant are equipped with an infotainment system (In-Vehicle Infotainment, IVI), the basis of which is a "modular infotainment kit" (MIB2). The MIB3 is intended for future vehicles. This MIB3 essentially consists of an Electronic Control Unit (ECU) with a monolithic microcontroller with peripheral components, whereby different hardware variants with submodules are used.

An infotainment system for vehicles is known from EP 1 908 639 A1, in which certain components can be replaced by current components or software components can be updated by means of an update, while other components are not updated or replaced.

DE 10 2015 005 704 A1 describes an infotainment system whose basic sound system has at least one audio channel with a loudspeaker permanently installed in the vehicle, which can be controlled by a main unit of the infotainment system and which has at least one interface for communicating with at least one external portable device. The main unit has an identification unit, by means of which at least one portable loudspeaker can be integrated into the sound system as an external portable device and as an additional audio channel in order to expand the sound system.

An infotainment expansion module according to DE 20 2015 005 533 U1 consists of a microprocessor and a hardware decoder decoding video and audio data, an API (Application Programming Interface) for connecting a preconfigured IVI system and a storage unit which enables the data exchange between the preconfigured IVI system and an external device. For this purpose, a predefined software interface of the external device is translated into a software interface of the preconfigured IVI system. The infotainment expansion module is connected to the IVI system wirelessly or in a wired manner via the API interface.

DETAILED DESCRIPTION

Figure 1:
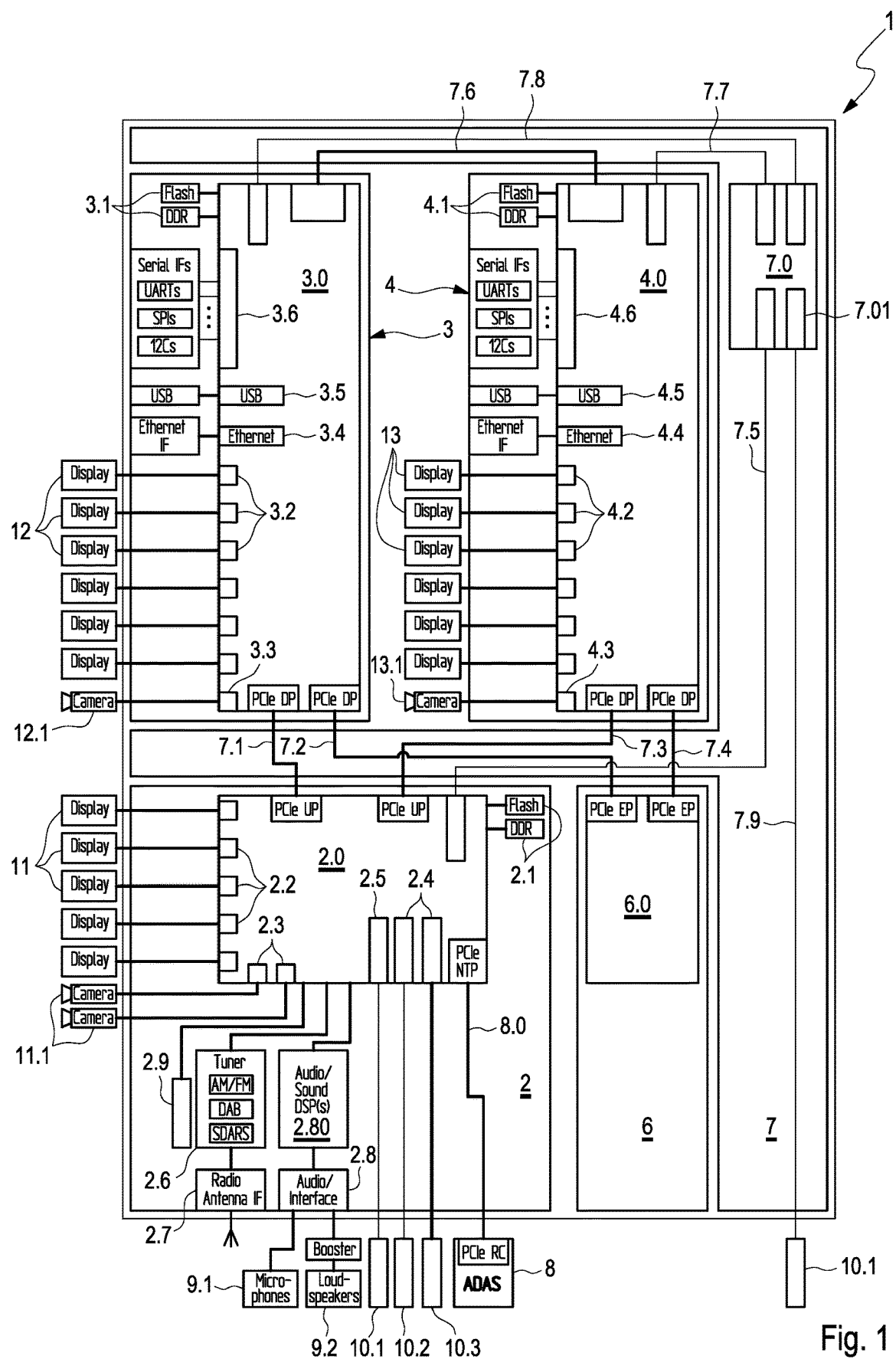
FIG. 1 shows a circuit diagram of a modular computer architecture of a first exemplary embodiment of the present disclosure.

The object of the disclosure is to provide a cockpit and infotainment system for a vehicle that is improved compared to the prior art, in particular in such a way that different configurations can be implemented in a simple manner and hardware components can be exchanged in a flexible and cost-effective manner and a software update and upgrade for software components is enabled. Furthermore, such a cockpit and infotainment system should be functionally expandable in a simple manner with hardware components.

This object is achieved by a cockpit and infotainment system according to some embodiments of the present disclosure.

Such a modular computer architecture of a cockpit and infotainment system for a vehicle includes an input/output (I/O) module with an I/O computing node with at least one data memory, the I/O computing node being designed for processing audio data and as a host computer for performing host functions with Automotive Safety Integrity Level (ASIL) security requirements. The I/O module also includes a tuner with associated antenna interface, and at least one interface of a vehicle bus system. The modular computer architecture further includes at least one computing module with a computing node with at least one data memory for performing cockpit and infotainment functions, and at least one display interface.

In this modular computer architecture according to the present disclosure, all region-specific, series-specific and brand-specific functions and the associated interfaces are carried out by the I/O module, so that a SoC (silicone and chip) system adapted for this and a correspondingly adapted software system for the I/O computing node can be used. By concentrating these functions on this I/O computing node, a variant reduction is achieved, since only the I/O module has to be adapted for new product variants.

Region-specific functions are, for example, country variants of the radio tuner. Series-specific and brand-specific functions relate, for example, to the processing of audio data, the functions relating to the tuner and the host functions with ASIL security requirements.

By concentrating these functions on the I/O module, a commercially available microprocessor for general processor applications can be used for the computing node, so that infotainment properties with the highest quality can be realized, such as the display resolution, graphics performance, network connection quality, etc. This means that no application-specific SoC systems are required for the computing node.

In some embodiments, the I/O computing node is designed to carry out host functions with the shortest startup time in the system start-up phase of the cockpit and infotainment system. This ensures that the run-up time of host functions that are critical with regard to the run-up time are ensured when they are located on the I/O computing node. Such host functions relate, for example, to the instrument clusters designed as displays, virtual exterior mirrors and the output of warning sounds.

In some embodiments, the I/O computing node is designed to carry out host functions which can be carried out at least partially after a system shutdown of the cockpit and infotainment system during a run-on phase, since execution of such a host function on the I/O computing node can be implemented in a correspondingly optimized manner in terms of power consumption by switching off the other computing nodes. Such host functions relate, for example, to the instrument clusters designed as displays, virtual exterior mirrors and the output of warning sounds.

Furthermore, the development of the disclosure, according to which the I/O computing node is designed to carry out host functions with critical latency behavior, leads to an execution of such a host function on the I/O computing node being implemented in a correspondingly optimized manner with respect to the latency behavior. Such host functions are, for example, an augmented reality head-up display (AR-HUD).

If the I/O computing node is connected to a driver assistance system module via a PCI (Peripheral Component Interconnect) bus, this leads to the exchange of data between the cockpit and infotainment system and the driver assistance system with a correspondingly large bandwidth and lower latency.

In some embodiments, the I/O computing node has a USB interface, for example for connecting a device for receiving storage media. According to a further development, the I/O computing node is designed with at least one display interface, with at least one camera interface optionally also being provided.

To implement functions that must meet a specific ASIL level, the displays and cameras connected to the display interface and camera interface must meet the International Organization for Standardization (ISO) 26262 safety standard, i.e. a specific ASIL level (ASIL=Automotive Safety Integrity Level).

In some embodiments, the at least one computing node has an interface of a vehicle bus system. This makes it possible to communicate with the vehicle.

In some embodiments, the at least one computing node has a USB interface, which makes it possible for further external devices, such as a TV tuner, to be connected via USB.

In some embodiments, the I/O computing node and the at least one computing node are connected to one another via a PCIe (Peripheral Component Intercon-nect Express) interface. This ensures that data can be exchanged with a correspondingly large bandwidth and low latency.

In some embodiments, the modular computer architecture has a memory module with a non-volatile memory for storing programs and data for execution and use by the at least one computing node, the storage node using a PCIe interface to which at least one computing node is connected. Both the I/O computing node and the at least one computing node can access such a central storage unit, which enables the exchange of data with a correspondingly large bandwidth and low latency.

In some embodiments, the modular computer architecture has a backplane with slots for the I/O module and the at least one computing module. The backplane is preferably designed with data communication lines for implementing the PCIe interfaces.

In some embodiments, the backplane has a microcontroller (housekeeping controller) for performing administrative and auxiliary functions (housekeeping) of the cockpit and infotainment system, the microcontroller being connected via serial interfaces, such as UART interfaces and/or hardware lines, to the I/O computing node and the at least one computing node. Such administration and auxiliary functions are, for example, a wake-up function, an on/off function and functions for power management. Such a microcontroller is preferably designed with an interface of a vehicle bus system, which enables the required communication with the vehicle.

Instead of the microcontroller on the backplane, it is also possible to train the I/O computing node to carry out administrative and auxiliary functions of the cockpit and infotainment system.

In some embodiments, the modular computer architecture is designed with at least one further computer module with a computer node, the computer nodes each being designed with an internal cache memory and being connected via an interface with cache coherence. If several computer modules are used (e.g. also more than two such computing modules), which are connected with cache coherence via such a bus, the caches of the computing modules can be synchronized without additional performance losses.

In some embodiments, for the modular computer architecture, an expansion module is provided which has an expansion node for the functional expansion of cockpit and infotainment functions, such as the integration of functions of a currently separate control unit or the expansion by a computing unit, which functions for implementation of an artificial intelligence or the processing of a neural network.

In some embodiments, the computing module of the modular computing architecture further includes at least one camera interface.

In some embodiments, the I/O module and all computing modules have an Ethernet interface as the vehicle interface. In some embodiments, the Ethernet interfaces of the I/O module and of all computing modules are connected via an Ethernet switch function and have a common Ethernet interface as a vehicle interface.

The displays and cameras that are connected to the display interfaces and camera interfaces of the computing module must also meet the ISO 26262 safety standard, i.e. a certain ASIL level.

Further advantages, features and details of the disclosure will become apparent from the claims, the following description of preferred embodiments and from the drawings.

The modular computer architecture according to the present disclosure is constructed in the manner of a modular system with various components, from which specific computer architectures for a cockpit and infotainment system (in-vehicle infotainment, IVI) of a vehicle can be built. Different computer architectures 1 from these components are shown in FIGS. 1 to 4.

This modular system consists of an I/O module 2 with an I/O computing node 2.0, a computing module 3 with a computing node 3.0 and a memory module 6 with a non-volatile memory 6.0. If necessary, an expansion module 5 with a computing node 5.0 is also provided (see FIG. 4).

Several such computing modules 3 can also be used to set up a cockpit and infotainment system. The computer architecture 1 according to FIG. 1 and according to FIG. 3 consists of an I/O module 2, two computing modules 3 and 4 and a memory module 6. These components are arranged as printed circuit boards on corresponding slots via plug connectors of a backplane 7 and connected via data communication lines of the backplane. The two computer architectures 1 according to FIGS. 1 and 3 differ in terms of hardware in that, according to FIG. 1, a microprocessor (housekeeping controller) 7.0 is additionally arranged on the backplane 7 for carrying out administrative and auxiliary functions.

Figure 2:
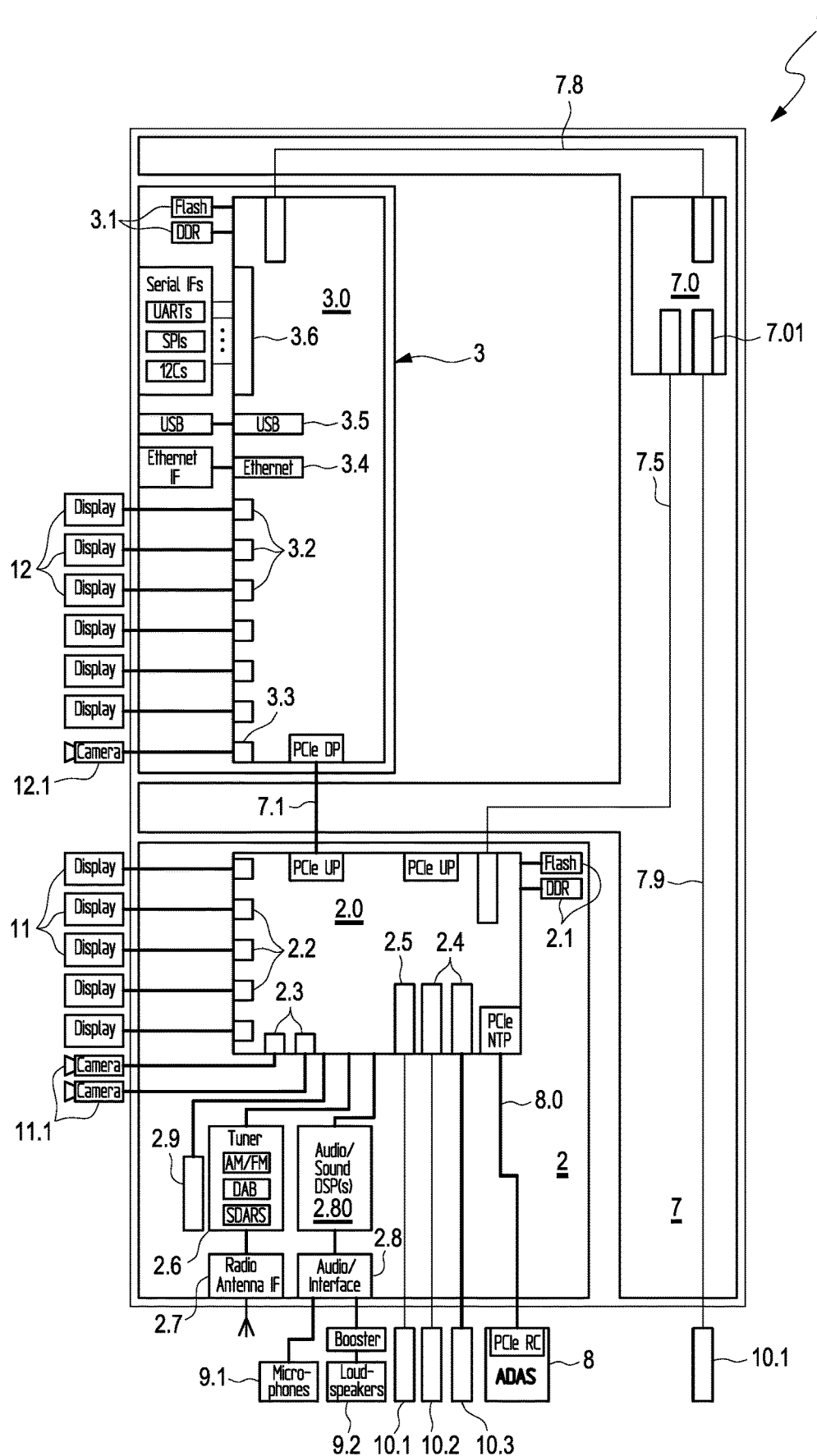
FIG. 2 shows a circuit diagram of a modular computer architecture of a second exemplary embodiment of the present disclosure.

In contrast, the computer architecture 1 according to FIG. 2 comprises, in addition to an I/O module 2, only a single computing module 3. These two components 2 and 3 are also arranged on a backplane 7.

Figure 4:
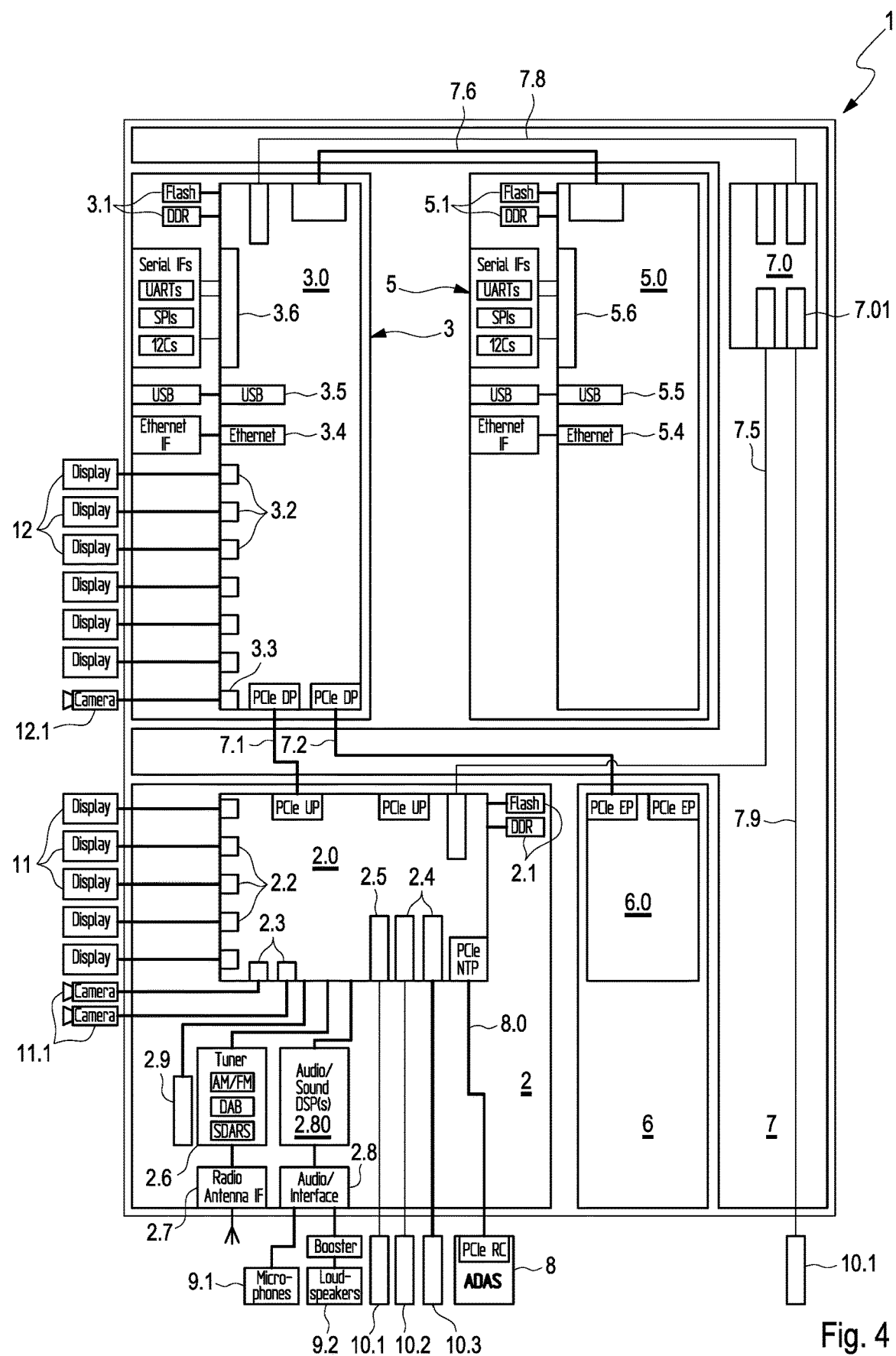
FIG. 4 shows a circuit diagram of a modular computer architecture of a fourth embodiment of the present disclosure.

In addition to an I/O module 2 and a single computing module 3, the computer architecture 1 according to FIG. 4 has an expansion module 5 instead of the further computing module 4.

The components of the modular system, the I/O module 2, the computing module 3 or 4, the expansion module 5 and the memory module 6 are described below and their functions and purposes are explained.

The I/O module 2 consists of the I/O computing node 2.0 arranged on a printed circuit board, which has a flash memory 2.1 and a DDR memory 2.1 as working memory. Audio data is processed with this I/O computing node 2.0. For this purpose, the I/O module 2 comprises a tuner 2.6 with an associated antenna interface 2.7. Audio data are communicated via an audio interface 2.8, to which a microphone 9.1 and a loudspeaker 9.2 can be connected with a booster as an amplifier. In addition, a digital signal processor (DSP) 2.80 for processing audio and sound signals can be connected between the audio interface 2.8 and the I/O computing node 2.0.

Furthermore, the I/O computing node 2.0 is designed with display interfaces 2.2 and camera interfaces 2.3 for connecting displays 11 as display devices for the instrument cluster of the vehicle and possibly for virtual mirrors and cameras 11.1. A head-up display (HUD) is also referred to as a display.

An infotainment peripheral module 2.9 is also provided, which is used, for example, for smartphone authentication.

Furthermore, the I/O computing node 2.0 has a USB interface 2.5 for connecting a media nodal point (media hub) 10.1, in order to connect peripheral components for cockpit, infotainment and vehicle interior functions, such as memory cards.

Finally, the I/O computing node 2.0 also has interfaces 2.4 to vehicle bus systems, such as CAN vehicle bus 10.2 and Ethernet vehicle bus 10.3.

With these functionalities, all region-specific, series-specific and brand-specific (based on a car brand) functions as well as the associated interfaces are implemented by the I/O module 2. This relates in particular to the functions of the tuner 2.6 and the host functions with ASIL safety requirements.

The I/O computing node 2.0 is used as a host computer for the computing module 3 and possibly for further computing modules 4 for performing host functions with ASIL safety requirements in accordance with the ISO 26262 safety standard. Such host functions relate, for example, to virtual mirrors, in which a display device (display) is used instead of a mirror surface, a head-up display (HUD) or the instrument cluster implemented with displays, the applications of which run with high safety requirements.

In addition, host functions with the shortest startup time of less than 2 s are implemented in the system start-up phase of the cockpit and infotainment system in the I/O computing node 2.0. Such functions are, for example, instrument clusters, virtual exterior mirrors and the output of warning sounds.

Likewise, host functions, which can be carried out at least in part after a system shutdown of the cockpit and infotainment system during a run-on phase, are implemented on the I/O computing node 2.0. Such functions relate, for example, to virtual exterior mirrors, including the associated cameras. Finally, functions with critical latency behavior are also implemented, i.e. functions that relate to an augmented reality head-up display (AR-HUD).

A SoC (silicone and chip) system adapted for this purpose and a correspondingly adapted software system for the I/O computing node 2.0 can be used to implement these host functions. Such an SoC system achieves high energy efficiency and enables real-time critical I/O interrupts to be processed.

Optionally, the I/O module 2 can be designed with sensors, such as 3-axis acceleration sensors. These sensors are used, for example, to optimize the implementation of an AR-HUD function.

Further options are the implementation of WLAN and BT (Bluetooth) functionalities using the I/O module 2.

Finally, the I/O module 2 can optionally be connected to a driver assistance system module 8 via, for example, a PCIe (Peripheral Component Interconnect Express) interface using an NTB (non-transparent bridge). Raw data and processed data are transmitted from a camera sensor of the driver assistance system of the vehicle via a data communication line 8.0. Corresponding information from the driver assistance system can thus be displayed in the cockpit and infotainment system.

A computing module 3 or 4 consists of a computing node 3.0 or 4.0 arranged on a printed circuit board with CPU (Central Processor Unit), GPU (Graphic Processor Unit) and, if necessary, also coprocessors, so-called NPUs (Numerical Processing Unit) to increase the computing speed for AI (Artificial Intelligence) applications and data memory 3.1 or 4.1, such as flash memory and DDR memory as working memory.

Furthermore, the computing module 3 or 4 is designed with an interface 3.4 or 4.4 for a vehicle bus system (for example Ethernet) and with a USB interface 3.5 or 4.5. Serial interfaces 3.6 and 4.6 are also provided as UART (Universal Asynchronous Receiver Transmitter) interface as well as for an SPI (Serial Peripheral Interface) bus and an I2C (Inter-Integrated Circuit) bus.

Figure 3:
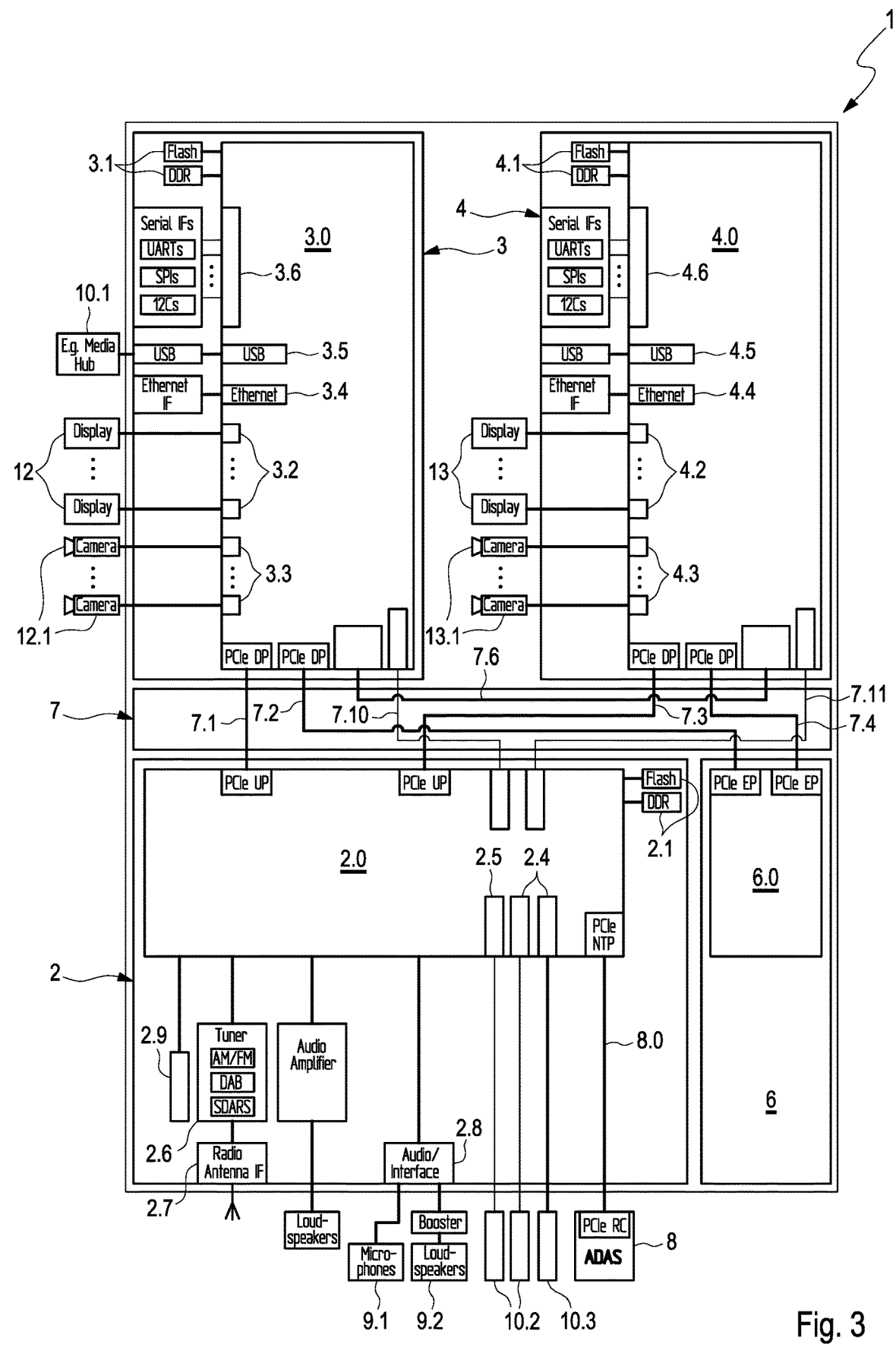
FIG. 3 shows a circuit diagram of a modular computer architecture of a third embodiment of the present disclosure.

According to FIGS. 1 and 3, two computing modules 3 and 4 are provided for the modular computer architecture 1, which are connected to cache coherence either by means of PCIe interfaces via a data communication line 7.6 if the computing nodes 3.0 and 4.0 are designed with cache memory.

The computing nodes 3.0 and 4.0 are connected to I/O node 2.0 via PCIe interfaces using data communication lines 7.1 and 7.3 as data communication lines.

The actual functionalities for the cockpit and for the infotainment system are carried out with such a computing module 3 or 4. Here, these functions are essentially neither region-specific and series-specific nor brand-specific, since such functions are carried out by the I/O module 2.

In the flash memory 3.1 or 4.1 of the computing node 3.0 or 4.0, boot blocks are placed up to a certain software level for booting the system, which is so general that it is neither region-specific and series-specific nor brand-specific.

Scalability with these computing modules can be achieved, on the one hand, via the number thereof that can be used for the modular computing architecture 1 and, on the other hand, via different performance levels.

With this division of the functions between the I/O module 2 and the computing module 3 or 4, the marketable processors available for general processor applications can be used for the computing node 3.0 or 4.0, so that infotainment properties relating, for example, to the display resolution, graphics performance, network connection quality, etc., can be realized with the highest quality. This means that no application-specific SoC systems are required for the computing node.

Another component of the modular system for a modular computer architecture 1 is, in addition to an I/O module 2 and a computing module 3 or 4, a memory module 6 with a non-volatile memory 6.0, which is in each case connected via a PCIe interface by means of a data communication line 7.2 or 7.4 to the computing nodes 3.0 and 4.0. All region-specific, series-specific and brand-specific software sections that are executed on a computer node 3.0 and 4.0 are stored on this memory 6.0, if possible.

The memory 6.0 can be executed as an SSD storage.

As a further component of the modular system for a modular computer architecture 1, an expansion module 5 with a microprocessor as expansion node 5.0 is provided for the functional expansion of cockpit and infotainment functions. A flash memory and DDR memory as data memory 5.1 are assigned to the microprocessor as rescue notes 5.0.

The expansion node 5.0 is designed with an interface 5.4 for a vehicle bus system (for example Ethernet) and with a USB interface 5.5. Serial interfaces 5.6 are also provided as a UART (Universal Asynchronous Receiver Transmitter) interface and for an SPI (Serial Peripheral Interface) bus and an I2C (Inter-Integrated Circuit) bus.

With such functional extensions, for example, high-quality sound functions can be realized. It is also possible to design the expansion node 5.0 as a graphics node to improve graphics processes and to connect additional displays.

Furthermore, such an expansion module 5 can be operated with additional operating systems, such as Android. Furthermore, such expansion modules 5 can also make future applications feasible.

Finally, the expansion modules 5 can also be used as a hardware expansion and thus, for example, WIFI and/or BT and/or telephone and/or AI (artificial intelligence) applications can be implemented.

The modular system for realizing a modular computer architecture for a cockpit and infotainment system of a vehicle is finally completed by the backplane 7 already mentioned above.

This backplane 7 serves both for data connection of the components of the modular system via PCIe interfaces or Ethernet interfaces, including the energy supply or power management of the individual components, and also for carrying out administration and auxiliary functions (housekeeping) by means of a microprocessor arranged on the backplane 7.0 (see FIGS. 1, 2 and 4). Such administrative and auxiliary functions are, for example, a wake-up function, an on/off function and a function for power control.

This microprocessor 7.0 is connected to the I/O computing node 2.0 and the computing node 3.0 and possibly also to the computing node 4.0 via serial UART interfaces by means of data communication lines 7.5, 7.7 and 7.8 of the backplane 7. Instead of UART interfaces, SPI, I2C, PCI or CAN interfaces can also be used. Furthermore, this microprocessor 7.0 is designed with a CAN interface 7.01, via which the microprocessor 7.0 is connected to a CAN bus 10.1 by means of a data communication line 7.9 of the backplane 7.

These components of the modular system provide a modularity in that an update, an upgrade or a replacement can be carried out for each individual module 2, 4, 5 and 6 independently of the others.

A variant reduction is achieved by means of the modular system in that all region-specific, series-specific and brand-specific functions are implemented in the I/O module 2 and the memory module 6. Corresponding product variants are generated solely by adapting these modules 2 and 6. The number of modules designed as plug-in cards, with which a certain number of variants can be generated, is thus considerably smaller than the number of those configurations if a monolithic ECU is used for a corresponding computer architecture.

The modular computer architecture 1 according to FIG. 1 represents a version consisting of the components of the modular system in a sophisticated high-end configuration, that is to say with the highest quality properties with regard to the cockpit and entertainment functions.

This modular computer architecture 1 according to FIG. 1 comprises the following components:
an I/O module 2 with an I/O computing node 2.0,
a computing module 3 with a computing node 3.0,
a further computing module 4 with a computing node 4.0,
a memory module 6 with a memory 6.0, and
a backplane 7 with a microprocessor (housekeeping controller) 7.0.

These modules 2, 3, 4 and 6 as well as the backplane 7 are implemented in accordance with the statements made above with regard to their structure and with regard to their functions.

The displays (display devices) 11 connected to the display interfaces 2.2 and the cameras 11.1 connected to the camera interfaces 2.3 are operated with high safety requirements (ASIL), since these represent instrument clusters, head-up displays (HUD) and, for example, virtual exterior mirrors with associated cameras 11.1. The high safety requirements are the reason why such displays 11 and associated cameras 11.1 are connected to the I/O computing node 2.0.

The displays 12 connected to the computing node 3.0 of the computing module 3 are display devices which are arranged, for example, in the region of the center console and/or in the region of a passenger seat of a vehicle. The camera 12.1 represents, for example, a reversing camera or an interior camera.

The displays 13 connected to the further computing nodes 4.0 of the computing module 4 are display devices which are integrated, for example, in the rear region of a vehicle, for example as screens in the rear seat back of the front seats. The camera 13.1 represents, for example, a reversing camera or an interior camera.

The modular computer architecture 1 according to FIG. 2 provides a lower level of performance than that according to FIG. 1, since in addition to the I/O module 2, only a single computing module 3 and no memory module is provided. A microprocessor (housekeeping controller) 7.0 corresponding to that of FIG. 1 is also arranged on a backplane 7. Because of the lack of a memory module, the region-specific, series-specific and brand-specific software sections are stored in a working memory, for example the DDR memory 2.1 of the I/O computing node 2.0. Otherwise, these components 2, 3 and 7 correspond in terms of their structure and their functions to the modules 2, 3 and 7 described above.

The modular computer architecture 1 according to FIG. 3 represents a version of the components of the modular system in a high-end configuration, that is to say with high quality properties with regard to the cockpit and entertainment functions.

This modular computer architecture 1 comprises the following components:
an I/O module 2 with an I/O computing node 2.0,
a computing module 3 with a computing node 3.0,
a further computing module 4 with a computing node 4.0, and
a memory module 6 with a memory 6.0.

In comparison to the modular computer architecture 1 according to FIG. 1, however, the backplane 7 lacks a microprocessor (housekeeping controller) for carrying out administration and auxiliary functions (so-called housekeeping functions).

Due to the lack of a microprocessor 7.0 of the backplane 7, the administration and auxiliary functions are implemented in the I/O computing node 2.0, as is the performance management.

Furthermore, the I/O computing node 2.0 is designed without display interfaces and camera interfaces. Corresponding displays 12 and cameras 12.1 are connected to the computing node 3.0 and corresponding displays 13 and cameras 13.1 are connected to the computing node 4.0. This applies in particular to the displays used as an instrument cluster, possibly the head-up display, the displays in the region of a center console of the vehicle, the displays in the rear region of the vehicle and the cameras inside the vehicle. In comparison to the connection of the displays 11 and cameras 11.1 to the I/O computing node 2.0 of the I/O module 2, data traffic via the backplane 7 with large bandwidth, which would be caused by the video transmission, is avoided.

The computing nodes 3.0 and 4.0 of the two computing modules 3 and 4 are each connected to the I/O computing node 2.0 of the I/O module 2 via UART interfaces by means of corresponding data communication lines 7.10 and 7.11.

Otherwise, these modules 2, 3, 4 and 6 and the backplane 7 are implemented in accordance with the above statements with regard to their structure and with regard to their functions. The backplane 7 according to FIG. 3 merely takes over the provision of the slots for the modules 2, 3, 4 and 6 and has corresponding data communication lines 7.1, 7.2, 7.3, 7.4, 7.10 and 7.11.

The modular computer architecture 1 according to FIG. 4 represents a version of the components of the modular system with high quality properties with regard to the cockpit and entertainment functions.

This modular computer architecture 1 comprises the following components:
- an I/O module 2 with an I/O computing node 2.0,
- a computing module 3 with a computing node 3.0,
- an expansion module 5 with an expansion node 5.0,
- a memory module 6 with a memory 6.0, and
- a backplane 7 with a microprocessor (housekeeping controller) 7.0.

These modules 2, 3, 5 and 6 and the backplane 7 are implemented in accordance with the above statements with regard to their structure and with regard to their functions. The expansion node 5.0 of the expansion module 5 and the computing node 3.0 of the computing module 3 are connected via PCIe interfaces by means of a data communication line 7.6. The expansion module 5 does not have any data connections to the other modules 2 and 6.

The modular system described for implementing a modular computer architecture, as the simplest version, only allows the use of the I/O module 2 as the computer architecture for a cockpit and infotainment system.

LIST OF REFERENCE NUMBERS 1 modular computer architecture
2 I/O module
2.0 I/O computing node of the I/O module 2
2.1 data memory of the I/O computing node 2.0
2.2 display interface of the I/O computing node 2.0
2.3 camera interface of the I/O computing node 2.0
2.4 interface of a vehicle bus system
2.5 USB interface
2.6 tuner
2.7 interface of the tuner
2.8 audio interface
2.80 digital signal processor
2.9 infotainment peripheral module
3 computing module
3.0 computing node of the computing module 3
3.1 data storage of the computing node 3.0
3.2 display interface of the computing node 3.0
3.3 camera interface of computing node 3.0
3.4 interface of a vehicle bus system
3.5 USB interface
3.6 serial interfaces
4 computing module
4.0 computing node of the computing module 4
4.1 data storage of the computing node 4.0
4.2 display interface of the computing node 4.0
4.3 camera interface of the computing node 4.0
4.4 interface of a vehicle bus system
4.5 USB interface
4.6 serial interfaces
5 expansion module
5.0 extension node of the processing module 5
5.1 data storage of the expansion node 5.0
5.4 interface of a vehicle bus system
5.5 USB interface
5.6 serial interface
6 memory module
6.0 non-volatile memory
7 backplane
7.0 microprocessor of the backplane 5
7.01 CAN interface
7.1 data communication line
7.2 data communication line
7.3 data communication line
7.4 data communication line
7.5 data communication line
7.6 data communication line
7.7 data communication line
7.8 data communication line
7.9 data communication line
7.10 data communication line
7.11 data communication line
8 driver assistance system module
8.0 data communication line
9.1 microphone
9.2 loudspeaker with booster
10.1 media node
10.1 CAN vehicle bus
10.2 ethernet vehicle bus
11 displays
11.1 cameras
12 displays
12.1 camera
13 displays
13.1 cameras

The invention claimed is:

1. A modular computer architecture of a cockpit and infotainment system for a vehicle, comprising:
an input/out (I/O) module, comprising:
an I/O computing node with a first data memory, the I/O computing node configured to process audio data and perform, as a host computer, host functions with ASIL (Automotive Safety Integrity Level) safety requirements;
a tuner with associated antenna interface; and
a first interface of a vehicle bus system,
wherein region-specific, series-specific and vehicle brand-specific functions and associated interfaces are implemented in the I/O module;
a first computing module, comprising:
a first computing node with a second data memory for performing cockpit and infotainment functions; and
a first display interface; and
a backplane comprising slots for the I/O module and the first computing module, wherein an upgrade or a replacement for the region-specific, series-specific and vehicle brand-specific functions and associated interfaces is carried out in the I/O module independently from the first computing module.

2. The modular computer architecture according to claim 1, wherein the I/O computing node is further configured to perform the host functions with a shortest startup time in a system start-up phase of the cockpit and infotainment system.

3. The modular computer architecture according to claim 1, wherein the I/O computing node is further configured to perform the host functions at least in part after a system shutdown of the cockpit and infotainment system during a run-on phase.

4. The modular computer architecture according to claim 1, wherein the I/O computing node is further configured to perform the host functions with a critical latency behavior.

5. The modular computer architecture according to claim 1, wherein the I/O computing node is connected to a driver assistance system module via a Peripheral Component Interconnect (PCI) bus.

6. The modular computer architecture according to claim 1, wherein the I/O computing node comprises a first USB interface.

7. The modular computer architecture according to claim 1, wherein the I/O computing node comprises a second display interface.

8. The modular computer architecture according to claim 1, wherein the I/O computing node comprises a first camera interface.

9. The modular computer architecture according to claim 1, wherein the I/O computing node is further configured to perform the host functions in compliance with safety standards according to ISO (International Organization for Standardization) 26262.

10. The modular computer architecture according to claim 1, wherein the first computing node comprises a second interface of the vehicle bus system.

11. The modular computer architecture according to claim 1, wherein the first computing node comprises a second USB interface.

12. The modular computer architecture according to claim 1, further comprising:
a memory module with a non-volatile memory configured to:
store programs and data for execution and usage by the first computing node; and
connect to the first computing node by a PCIe (Peripheral Component Interconnect Express) interface.

13. The modular computer architecture according to claim 1, wherein the I/O computing node and the first computing node are connected to each other via PCIe (Peripheral Component Interconnect Express) interfaces.

14. The modular computer architecture according to claim 13, wherein the backplane is configured to connect the PCIe interfaces with data communication lines.

15. The modular computer architecture according to claim 14, wherein the backplane further comprises a microcontroller, the microcontroller configured to:
perform administrative functions or auxiliary functions of the cockpit and infotainment system; and
connect, via serial interfaces and/or hardware lines, to the I/O computing node and the first computing node.

16. The modular computer architecture according to claim 15, wherein the microcontroller comprises a third interface of the vehicle bus system.

17. The modular computer architecture according to claim 1, wherein the I/O computing node is further configured to perform administrative functions or auxiliary functions of the cockpit and infotainment system.

18. The modular computer architecture according to claim 1, further comprising:
a second computing module, comprising a second computing node wherein
the first and the second computing nodes each comprises an internal cache memory; and
the first and the second computing nodes are connected with each other via an interface with cache coherence by data communication lines.

19. The modular computer architecture according to claim 1, further comprising:
an expansion module having an expansion node for functional expansions of the cockpit and infotainment functions.

20. The modular computer architecture according to claim 1, wherein the first computing module comprises a second camera interface.

21. The modular computer architecture according to claim 1, wherein the I/O module and the first computing module each comprises an Ethernet interface as a vehicle interface.

22. The modular computer architecture according to claim 21, wherein the Ethernet interfaces of the I/O module and the first computing module are connected via an Ethernet switch function and comprise a common Ethernet interface as the vehicle interface.

* * * * *